United States Patent Office 3,839,477
Patented Oct. 1, 1974

3,839,477
HYDROALKYLATION PROCESS
Robert M. Suggitt, Wappingers Falls, John M. Crone, Jr., Fishkill, and Alfred Arkell, Wappingers Falls, N.Y., assignors to Texaco Inc., New York, N.Y.
No Drawing. Continuation-in-part of application Ser. No. 312,441, Dec. 6, 1972. This application June 6, 1973, Ser. No. 367,611
Int. Cl. C07c 5/12
U.S. Cl. 260—668 R
17 Claims

ABSTRACT OF THE DISCLOSURE

Hydroalkylation of eg benzene is effected by use of a catalyst containing cobalt or nickel on a rare earth exchanged aluminosilicate.

RELATED APPLICATIONS

This application is a continuation-in-part application of the following pending application:
Ser. No.: 312,441
Filed: Dec. 6, 1972
For: Hydroalkylation of Mononuclear Aromatic Hydrocarbons
Inventors: Robert M. Suggitt; John M. Crone, Jr.; and Alfred Arkell

FIELD OF THE INVENTION

This invention relates to hydroalkylation. More specifically it relates to hydroalkylation of benzene, in the presence of a particular catalyst, to permit attainment of cyclohexylbenzene.

BACKGROUND OF THE INVENTION

As is well known to those skilled in the art, it is possible to hydroalkylate aromatic, preferably mononuclear, hydrocarbons such as benzene by reaction with hydrogen in the presence of hydroalkylation catalyst under hydroalkylation conditions to yield product hydroalkylate.

Illustrative of such processes are those disclosed in the following copending applications, each assigned to Texaco Inc. the same assignee as that of the present application:

Ser. No.: 144,213
Filed: May 17, 1971
For: Hydroalkylation Catalyst and Process
Inventors: Suggitt, Robert M.; Arkel, Alfred; Crone, Jr., John M. (now U.S. Pat. 3,760,018 issued Sept. 18, 1973)

Ser. No.: 144,211
Filed: May 17, 1971
For: Hydroalkylation Catalyst and Process
Inventors: Arkell, Alfred; Crone, John M. Jr.; Suggitt, Robert M. (now U.S. Pat. 3,760,017 issued Sept. 18, 1973)

Ser. No.: 144,214
Filed: May 17, 1971
For: Hydroalkylation Catalyst and Process
Inventors: Crone, John M. Jr.; Arkell, Alfred (now U.S. Pat. 3,760,019 issued Sept. 18, 1973)

During hydroalkylation of benzene for example, it is desired to produce as the principal product, cyclohexyl benzene. While it may be possible to recover and to find use for the by-products, their presence is generally undesirable. Among these by-products may be noted naphthenes typified by methylcyclopentane (MCP). Cyclohexane is also found to be present as are polycyclohexylbenzenes typified by dicyclohexylbenzenes (DCHB) and tricyclohexylbenzenes (TCHB). A particularly undesirable by-product is that identified as cyclohexylbenzene (CHB) impurities—which are compositions boiling within the boiling range within which CHB is recovered and which are thus difficulty separable.

Successful operation of a hydroalkylation operation under commercial conditions requires that hydroalkylation be carried out at conditions which minimize the formation of by-product naphthenes and CHB impurities and which maximize the formation of desired CHB.

It is an object of this invention to provide a method for hydroalkylation. It is another object of this invention to provide a method for hydroalkylation under conditions conducive to decreased formation of undesirable by-products. Other objects will be apparent to those skilled in the art.

STATEMENT OF THE INVENTION

In accordance with certain of its aspects, the novel process of this invention for hydralkylating a charge mononuclear hydrocarbon with a hydroalkylating quantity of hydrogen may comprise passing said charge hydrocarbon and said hydroalkylating quantity of hydrogen through a hydroalkylation operation at hydroalkylating conditions in the presence of a hydroalkylation catalyst containing (a) a crystalline aluminosilicate, at least a portion of the metal cation content of which is rare earth introduced by base exchange, and (b) cobalt or nickel, thereby forming a product stream containing hydroalkylate; and
recovering said product stream containing hydroalkylate.

DESCRIPTION OF THE INVENTION

The charge mononuclear aromatic hydrocarbons which may be hydroalkylated by the process of this invention may include benzenes, including substituted benzenes, such as benzene se, toluene, xylenes, etc. The preferred charge may be benzene se.

The charge may include, in addition to fresh charge benzene, other components including cyclohexylbenzene, dicyclohexylbenzenes, tricyclohexylbenzenes, etc. Hydroalkylation may preferably be effected in one embodiment by passing to the hydroalkylation operation a charge mononuclear aromatic hydrocarbon, typically benzene, together with recycled materials, typically dicyclohexylbenzenes. Among the latter may be ortho-dicyclohexylbenzene, meta-dicyclohexylbenzene, and para-dicyclohexylbenzene.

The composition of a typical charge (ex hydrogen) entering the reactor may include:

TABLE

| Component | Parts | Typical |
|---|---|---|
| Benzene | 40–99.5 | 92.6 |
| Cyclohexylbenzene | 0–5 | 0.6 |
| Ortho-dicyclohexylbenzene Meta-dicyclohexylbenzene | 0.5–15 | 5.2 |
| Para-dicyclohexylbenzene | 0–15 | 1.6 |
| Methyl cyclopentane | 0–10 | 0 |
| Cyclohexane | 0–15 | 0 |

Other components may be present, including methyl cyclopentyl benzenes, bicyclohexyl, tricyclohexyl benzenes, etc.

Preferable 100 parts by weight of benzene and a hydroalkylating quantity, preferably 0.2–10 parts, more preferably 0.3–5 parts, say 2.5 parts by weight of hydrogen may be employed for hydroalkylation.

Hydroalkylation may be effected in the presence of a hydroalkylation catalyst and a hydroalkylating quantity of hydrogen. The hydrogen need not be pure; but preferably hydrogen of 80%–100% purity may be used. The hydrogen should preferably be free of any impurities which may poison the catalyst. Hydrogen recovered from a reforming operation may be suitable. The feed should be free of oxygen or oxygen-forming materials such as water, alcohols, hydroperoxides, dissolved oxygen, carbon dioxide, etc. Preferably the oxygen content of the total charge should be less than 5 p.p.m. to give acceptable catalyst life.

The hydroalkylation catalyst used in practice of the process of this invention may contain (a) a crystalline aluminosilicate at least a portion of the metal cation content of which is rare earth introduced by base exchange, and (b) cobalt or nickel.

The crystalline aluminosilicates which may be used herein are generally available as zeolites; and they have been described in many prior patents and publications. These materials are essentially the dehydrated forms of crystalline, natural or synthetic hydrous siliceous zeolites containing varying quantities of alkali metal, silicon and aluminum with or without other metals. The alkali metal atoms, silicon, aluminum, and oxygen in these zeolites are arranged in the form of an aluminosilicate salt in a definite and consistent crystalline pattern. The structure contains a large number of small cavities interconnected by a number of still smaller holes or channels. These cavities and channels are precisely uniform in size. The alkali metal aluminosilicate zeolite used in preparation of the catalysts described herein has a uniform pore structure comprising openings characterized by an effective pore diameter of between 6 and 15 angstroms. A typical comercially available zeolite fulfilling the above requirements is the X type zeolite and, specifically, $13\times$ zeolite marketed by the Linde Division of Union Carbide Corporation and described in U.S. 2,882,244.

In general, the process for preparing such alkali metal aluminosilicates involves heating, in aqueous solution, an appropriate mixture of oxides or of materials whose chemical composition can be completely represented as a mixture of oxides $Na_2O$, $Al_2O_3$, $SiO_2$, and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12 and, thereafter, is dehydrated by heating. Generally, an alkali metal silicate serves as the source of silica and an alkali metal aluminate as the source of alumina. An alkali metal hydroxide is suitably used as the source of the alkali metal ion and, in addition, contributes to the regulation of the pH. All reagents are preferably soluble in water. While it is contemplated that alkali metal aluminosilicates having the above-designated pore characteristics may be employed in preparation of the described catalysts, it is generally preferred to use a sodium aluminosilicate. Thus, assuming sodium as the alkali metal, the reaction mixture should contain a molar ratio of $Na_2O/SiO_2$ of at least 0.5/1 and, generally, not in excess of 2/1. Sodium aluminate having a molar ratio of $Na_2O/Al_2O_3$, in the range of 1/1 to 3/1 may be employed. The amounts of sodium silicate solution and sodium aluminate solution are such that the molar ratio of silica to alumina in the final mixture is at least 2.2/1. Preferably, the solution has a composition expressed as mixtures of oxides within the following ranges: $SiO_2/Al_2O_3$ of 3 to 5, $Na_2O/SiO_2$ of 1.2 to 1.5 and $H_2O/Na_2O$ of 35 to 60. The reaction mixture is placed in a suitable vessel which is closed to the atmosphere in order to avoid losses of water and reagents are then heated for an appropriate length of time. A convenient and generally employed process for making the sodium aluminosilicate reactant involves reaction of aqueous solutions of sodium aluminate and sodium silicate to which may be added sodium hydroxide. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As soon as the zeolite crystals are completely formed they retain their structure and it is not essential to maintain the temperature of the reactant any longer in order to obtain a maximum yield of crystals.

After formation, the crystalline zeolite is separated from the mother liquor usually by filtration. The crystalline mass is then washed, preferably with water and while on the filter until the wash water in equilibrium with the zeolite reaches a pH of 9 to 12.

The catalysts utilized in the present process are prepared by base-exchanging a crystalline alkali metal aluminosilicate, such as described hereinabove, having a structure of rigid three-dimensional networks characterized by a uniform pore diameter between 6 and 15 angstrom units with rare earth metal ions and thereafter washing the base-exchanged material free of soluble salts, drying the washed composite, and subjecting the same to a thermal activating treatment.

The base-exchange solutions employed may be contacted with the crystalline zeolite of uniform port structure as formed, after washing free of soluble salts or in the form of a fine powder, a compressed pellet, extruded pellet, or other suitable particle shape. When in the form of a pellet the crystalline zeolite may be combined with a binder such as clay. It has been established that the desired base-exchange may be effected most readily for the alkali metal aluminosilicate zeolite undergoing treatment which has not previously been subjected to a temperature above about 600° F.

Base-exchange required for introducing the aforementioned rare earth metal ions may be accomplished by contacting the alkali metal aluminosilicate zeolite for a sufficient period of time and under appropriate temperature conditions to replace at least about 75 percent and, preferably, at least about 90 percent of the alkali metal contained in the aluminosilicate zeolite with ions of rare earth metal to effectively reduce the content of alkali metal of the resulting composite to below 4 weight percent and preferably less than 1 weight percent.

It is contemplated that any of the readily available rare earth metal compounds may be employed for the above purpose. Generally, compounds will be used wherein the rare earth metal-containing ion is present in the cationic state. Representative rare earth metal compounds include nitrates, bromides, acetates, chlorides, iodides and sulfates of one or more of the rare earth metals including cerium, lanthanum, praseodymium, neodymium, samarium, europium, gadolinium, terbium, ryprosium, holmium, erbium, thulium, ytterbium, and lutetium. Naturally occurring rare earth minerals offer a convenient source for the rare earth metals. The natural rare earth metal-containing mineral may be extracted with an acid such as sulfuric, or rare earth oxides and related metal oxides in admixture from a natural earth may be dissolved in other solubilizing acids such as acetic. For example, monazite which contains cerium compounds as the principal rare earth metal compound present with lesser portions of thorium compounds and other rare earth compounds may be used as a suitable source of cerium. Mixtures of rare earth metal salts for example, chlorides of lanthanum, cerium, praseodymium, neodymium, samarium and gadolinium available commercially at a relatively low cost may be effectively employed.

While water will ordinarily be the solvent in the base-exchange solutions used, it is contemplated that other solvents, although generally less preferred, may be used, in which case, it will be realized that the above list of representative rare earth metal compounds may be expanded. Thus, in addition to aqueous solutions, alcoholic solutions, etc. of the rare earth metal-containing compounds may be employed in producing the catalyst utilized in the present process. It will be understood that such rare earth metal compounds employed undergo ionization in the particular solvent used.

The concentration of rare earth metal compound employed in the base-exchange solutions may vary depending on the alkali metal aluminosilicate undergoing treatment and on the condition under which treatment is effected. The overall concentrations of replacing metal ions, however, is such as to reduce the alkali metal content of the original alkali metal aluminosilicate to less than 4, and preferably, less than 1 weight percent. In base-exchanging the alkali metal aluminosilicate with a solution of a rare earth metal compound, generally the concentration of such compound is within the range of 1 to 30 percent by weight. The pH of such exchange solution is generally within the approximate range of 3.5 to 6.5 and, preferably, between about 4 and about 5.5.

The temperature at which base-exchange is effected may vary widely, generally ranging from room temperature to an elevated temperature below the boiling point of the treating solution. The volume of base-exchange solution employed in any instance may vary widely. Generally, however, an excess is employed and such excess is removed from contact with the crystalline aluminosilicate zeolite after a suitable period of contact. The time of contact between the base-exchange solution and crystalline zeolite in any instance is such as to effect substantial replacement of the alkali metal ions thereof with rare earth metal ions. It will be appreciated that such period of contact may vary widely depending on the temperature of the solution, the nature of the alkali metal aluminosilicate used and the particular rare earth metal compounds employed. Thus, the time of contact may extend from a brief period of the order of a few hours for small particles to longer periods of the order of days for large pellets. The exchange may also be carried out with several batches of solution wherein contact time per batch may range from about ½ hour to 2 hours. Generally, the total time of contact will, depending on the various aforementioned factors, be within the range of ½ hour to 80 hours.

After the base-exchange treatment, the product is removed from the treating solution. Anions introduced as a result of treating with the rare earth metal base exchange solutions are removed by water-washing the treated composite for such period of time until the same is free of said anions. The washed product is then dried, generally in air to remove substantially all of the water therefrom. While drying may be effected at ambient temperature, it is generally more satisfactory to facilitate the removal of moisture by maintaining the product at a temperature between about 150 and about 600° F. for 4 to 48 hours.

The dried material is then essentially subjected to an activating treatment which entails heating the dried material generally in air to a temperature within the approximate range of 500° F. to 1500° F. for a period of between 1 and 48 hours. The resulting product has a surface area within an approximate range of 50 to 600 square meters per gram and generally contains between about 0.1 and about 4 weight percent alkali metal, between about 25 and about 40 weight percent alumina and between about 40 and about 60 weight percent silica.

The above rare earth metal aluminosilicate may be intimately combined with cobalt or nickel. Combination may be effected by impregnating the rare earth metal aluminosilicate by contacting the same with solutions of cobalt or nickel ions. In another embodiment, the cobalt or nickel may be impregnated or deposited on a base such as finely divided alumina; and the impregnated alumina mixed with the rare earth zeolite. In another embodiment, the cobalt or nickel may be exchanged into the aluminosilicate either before or after the rare earths are exchanged thereinto. In still another embodiment, the cobalt or nickel may be slurried into the mixture from which the zeolite is produced.

The cobalt or nickel may be present in the catalyst in amount of 0.01–25%. The weight percents of cobalt or nickel in this specification are weight percent of the metal with respect to the total catalyst including rare earth exchanged zeolite plus matrix. It is however, a feature of this invention that desired results may be achieved (in terms of increased selectivity) by use of a catalyst containing 2%–10%, say 4% cobalt or nickel, preferably cobalt, based upon the total weight of catalyst including rare-earth exchanged aluminosilicate (plus matrix when present).

The catalyst compositions are dried in air at e.g. 100° C., further dried at 150° C., and then calcined to a maximum temperature of up to 800° C. During calcination, residual anions (commonly nitrates resulting from the preferred compositions in which the cobalt or nickel are supplied) are decomposed and the catalyst is dehydrated. The catalyst, preferably after loading into the hydroalkylation unit, is reduced in the presence of hydrogen for a minimum of 1 hour, and typically at least 4–8 hours at temperature above about 300° C. and typically 300° C.–700° C., say 500° C.

Typical catalysts so prepared may include:

(a) a catalyst containing 4% cobalt on a support containing 16% rare earth-exchanged zeolite Y (atom ratio of Si:Al of 2.1 to 1 in the zeolite) dispersed in a silica-alumina matrix. The total composition contains 4% cobalt, 0.97% lanthanum, 0.41% cerium, 0.42% neodymium, 0.07% sodium, and lesser amounts of other rare earths;
(b) a catalyst as in (a) but containing 8% cobalt;
(c) a catalyst as in (a) but containing 22% cobalt;
(d) a catalyst as in (a) but containing 4% nickel instead of cobalt;
(e) a catalyst as in (a) but containing 4% cobalt and 4% nickel;
(f) a catalyst as in (a) but containing as the support a zeolite X in place of the zeolite Y.

Hydroalkylation of aromatic feed may be effected by using this catalyst at an LHSV of 1.0–15, typically 2–10, say 3.

The pressure of hydroalkylation may typically be 100–1500 p.s.i.g., preferably 100–500 p.s.i.g., say 500 p.s.i.g.; at this pressure the reactants are maintained substantially in liquid phase—except for the hydrogen which is in gas phase.

Hydroalkylation is carried out at inlet temperature of 25° C.–220° C., typically 80°–200° C., say 160° C. or lower.

The composition of the hydroalkylate product will be a function of the charge to the hydroalkylation operation. In one embodiment where the charge is 100 parts of benzene and 0.3–5 parts, say 2.5 parts of hydrogen, the product (ex hydrogen) may typically contain the following:

TABLE

| Component | Broad | Preferred |
|---|---|---|
| Benzene | 30–95 | 53 |
| Cyclohexylbenzene | 5–35 | 22.5 |
| Ortho- and meta-dicyclohexylbenzenes | 0–15 | 7.5 |
| Para dicyclohexylbenzene | 0–15 | 7.0 |
| Tricyclohexylbenzenes | 0–5 | 2 |
| Methylcyclopentane | 0–10 | 1 |
| Cyclohexane | 0–15 | 8 |
| Cyclohexylbenzene impurities | 0–3 | 0.5 |
| Dicyclohexylbenzene impurities | 0–3 | 0.5 |

It is a particular feature of the process of this invention that the use of the catalyst permits attainment of unexpected and unobvious results. It is found for example that the reaction permits attainment of hydroalkylate product containing 20–30%, say 27% of the desired cyclohexylbenzene. Comparable control processes may produce hydroalkylate containing 4–14%, say about 12%.

It is a further feature of the process of this invention that it permits attainment of product hydroalkylate wherein the CHB ratio (of undesired cyclohexylbenzene impurities to desired cyclohexylbenzene) may be maintained below about 10% and commonly as low as 1%–2%, say 1.38%.

It is also a feature of the process of this invention that the naphthene ratio (of undesired methylcyclopentane to cyclohexylbenzene) may be maintained below about 10% and commonly as low as about 3%.

While it may be possible in control processes to achieve better results with respect to one or two of these important values, the novel process of this invention makes it readily possibly to simultaneously achieve a higher CHB selectivity while simultaneously decreasing the CHB ratio and the naphthene ratio.

EXAMPLE I

In this embodiment of the process of the invention, a commercially available (under the designation Linde SK–40 Brand) sodium Y zeolite was employed. This synthetic crystalline aluminosilicate NaY type zeolite may have a composition in which the oxide-mole ratio $SiO_2:Al_2O_3$ is 4.10 and may correspond to the formula:

$$0.9 \pm 0.2 Na_2O : Al_2O_3 : 4.10 SiO_2 : H_2O$$

This charge zeolite may have a density of 1.2–1.4 g./cc., a void volume of 30–40 cc./kg., and be characterized by apertures of 7–10 A. The unit cell formula of the charge NaY-type zeolite may be

$$Na_{63}(AlO_2^-)_{63}(SiO_2)_{129} \cdot 264 H_2O$$

This charge NaY-type zeolite is suspended for 2 hours at 150° F. in a solution containing 20 wt. percent of rare earth chlorides. The rare earth (RE) content includes lanthanum ($La_2O_3$), cerium ($CeO_2$), and neodymium in a mole ratio of 1.8:2.0:1.0 plus lesser amounts of other rare earths. The slurry of zeolite in solution is then heated to 200° F. and maintained at that level for 30 minutes with stirring. The zeolite is then filtered and the procedure repeated with fresh solution; and the zeolite is then filtered. The cake is washed chloride-free by slurrying in deionized water several times and filtering after each slurrying.

The cake is dried at 220° F. for one hour and calcined at 1000° F. for 3 hours. The calcined sieve is slurried in aqueous solution of ammonium sulfate $(NH_4)_2SO_4$. The slurry is boiled over one hour with stirring; and the zeolite is filtered. The procedure is repeated once again. The product may correspond to the following formula:

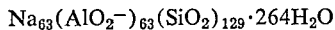
$$7Na^+, 0.8Mg^{+2}, 12[R.E. \ OH]^{+2}, 30.4NH_4^+, 63AlO_2^-, 129SiO_2 : xH_2O$$

One part of this rare earth exchanged zeolite (dry basis) is contacted with 5 parts of silica-alumina matrix, and an aqueous solution containing 117 parts by weight of cobalt nitrate hexahydrate $Co(NO_3)_2 \cdot 6H_2O$. The mixture is pelleted and dried at 220° F., then calcined for 3 hours at 1480° F., and pre-reduced at 900° F. for 2 hours in hydrogen flowing at 570 v./v. per hour at atmospheric pressure.

This catalyst which is used as hydroalkylation catalyst in Example I contains 4% cobalt, 0.76% lanthanum, 0.88% cerium, 0.43% neodyminum, and lesser amounts of other rare earths—as well as 0.20% sodium.

Charge benzene is pretreated with sodium to remove all forms of oxygen-containing components and then pumped over calcined molecular sieves at room temperature before entering the reactor. The hydrogen used is deoxygenated hydrogen.

Details of the process conditions including inlet temperature to the catalyst bed ° C., max. temperature in the catalyst bed ° C., pressure p.s.i.g., LHSV of benzene, and mole ratio of hydrogen to benzene are set forth in the table which follows Example IX. The product analysis is also delineated—for Example I-IV on a weight percent basis and for Examples V-IX on a basis of GC Area percent—i.e. percent of the area under the curve as determined by gas chromatography—which corresponds to weight percent.

EXAMPLES II–IV

In these experimental Examples, the catalyst is prepared as in Example I except that instead of 1.17 parts of Cobalt nitrate $Co(NO_3)_2 \cdot 6H_2O$, there are added 1.17 parts of nickel nitrate $Ni(NO_3)_2 \cdot 6H_2O$ to form a catalyst containing 4% nickel.

EXAMPLES V–VII

In these control examples, the catalyst is prepared as in Example I except that instead of 1.17 parts of cobalt nitrate Co $(NO_3)_2 \cdot 6H_2O$, there are added 0.134 parts of ammonium chloroplatinate $(NH_4)_2PtCl_6$. The product, so obtained, contains 1% platinum on rare earth exchanged zeolite.

EXAMPLES VIII–IX

In these control examples, the catalyst is prepared as in Example I, except that instead of 1.17 parts of cobalt nitrate $Co(NO_3)_2 \cdot 6H_2O$, there are added 0.127 parts of palladium nitrate Pd $(NO_3)_2$. The product, so obtained, contains 1% palladium on rare earth exchanged zeolite.

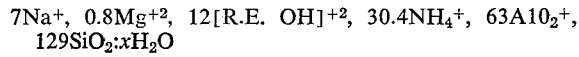

|  | Example | | | |
|---|---|---|---|---|
|  | I | II | III | IV |
| Metal and weight percent | 4% cobalt | 4% nickel | 4% nickel | 4% nickel |
| Process conditions: | | | | |
| Hours-on stream | 18 | 6 | 24 | 28 |
| Inlet temp. to cat. bed, ° C | 163 | 119 | 140 | 136 |
| Max. temp. in cat. bed, ° C | 183 | 166 | 199 | 222 |
| Pressure, p.s.i.g | 490 | 500 | 380 | 450 |
| LHSV benzene | 2 | 2 | 2 | 2 |
| H₂/benzene mole ratio | ª 0.9:1 | ª 0.67:1 | 0.53:1 | 0.62:1 |
| Product analysis, wt. percent: | | | | |
| C₅ and lighter | | | | |
| Methylcyclopentane | 0.08 | 0.23 | 0.47 | 1.17 |
| Cyclohexane | 4.69 | 2.73 | 5.60 | 7.03 |
| Benzene | 60.74 | 74.62 | 60.58 | 54.79 |
| Cyclohexylbenzene impurities | 0.37 | 0.39 | 0.82 | 1.61 |
| Cyclohexylbenzene | 26.80 | 18.09 | 24.62 | 26.79 |
| Dicyclohexylbenzene impurities | 0.18 | 0.13 | 0.41 | 0.61 |
| Dicyclohexylbenzenes | 7.21 | 3.68 | 7.43 | 7.93 |
| Tricyclohexylbenzenes | | | 0.02 | 0.03 |
| Percent hydrogen consumed to C₆ naphthenes | 27 | 27 | 32.5 | 37 |

TABLE—Continued

| | Example | | | | |
|---|---|---|---|---|---|
| | V | VI | VII | VIII | IX |
| Metal and weight percent | 1% platinum | 1% platinum | 1% platinum | 1% palladium | 1% palladium |
| Process conditions: | | | | | |
| Hours-on-stream | 12 | 24 | 36 | 12 | 24 |
| Inlet temp. to cat. bed, °C | 108 | 136 | 136 | 87 | 142 |
| Max. temp. in cat. bed, °C | 134 | 178 | 210 | 293 | 288 |
| Pressure, p.s.i.g | 445 | 385 | 490 | 440 | 435 |
| LHSV benezene | 2 | 2 | 2 | 2 | 2 |
| $H_2$/benzene mole ratio | 0.39:1 | 0.55:1 | 0.59:1 | 1.37:1 | 1.08:1 |
| Product analysis, GC area, percent: | | | | | |
| $C_5$ and lighter | | | | 0.04 | 0.03 |
| Methylcyclopentane | | 0.11 | 0.53 | 5.13 | 5.02 |
| Cyclohexane | 10.97 | 13.95 | 20.22 | 39.74 | 29.27 |
| Benzene | 81.50 | 69.78 | 59.65 | 46.45 | 54.57 |
| Cyclohexylbenzene impurities | 0.24 | 0.64 | 1.68 | 3.68 | 3.63 |
| Cyclohexylbenzene | 6.38 | 12.55 | 13.28 | 4.04 | 6.48 |
| Dicyclohexylbenzene impurities | | | 0.36 | 0.37 | 0.33 |
| Dicyclohexylbenzenes | 0.91 | 2.90 | 4.00 | 0.54 | 0.67 |
| Tricyclohexylzenes | | 0.07 | 0.25 | | |
| Percent hydrogen consumed to $C_6$ napthenes | 78 | 70 | 74 | 93 | 90 | a Hydrogen *not* completely consumed.

It will be apparent from the above table that the use of cobalt (in the preferred concentration of 4% by weight) on rare earth zeolite plus silica-alumina matrix permits attainment of outstanding results. The content of CHB in the product stream in Example I is 26.80%. The comparable concentrations in experimental Examples II–IV are 18.09%–24.02%–26.79%. In contrast, in control Examples V–IX, the CHB concentrations are undesirably less than half that of Example I viz: 6.38%–12.55%–13.28%–4.04%–6.48%.

The CHB ratio of experimental Examples I–IV is 1.38%–2.16%–3.33%–6% while that of control Examples V–IX is undesirably higher: 3.75%–5.1%–12.7%–91%–55%. Thus it is apparent that the CHB ratio may be lowered to 1.38% (Example I) at a CHB content of 26.80% while the best control (Example V) gives a CHB gives a CHB ratio of only 3.75% but at an undesirably low CHB content of 6.38%.

Furthermore the naphthene ratio of the experimental Examples I–IV is 0.3%–1.27%–1.9%–4.4% while that of control Examples VI–IX is 0.88%–4.0%–127%–77.8%. Clearly it is apparent that practice of the novel process of this invention permits attainment (in the preferred Example I) of a naphthene ratio as low as 0.3% while simultaneously and unexpectedly showing a CHB ratio of only 1.38% and a CHB content of 26.80%.

Results comparable to those achieved in Example I may be obtained by using the following catalysts:

Example X—A catalyst prepared as in Example I except that it contains 8% cobalt on rare-earth exchanged zeolite Y plus silica-alumina matrix;

Example XI—A catalyst prepared as in Example I except that it contains 22% cobalt on rare earth exchanged zeolite Y plus silica-alumina matrix;

Example XIII—A catalyst prepared as in Example I except that it contains 4% cobalt on rare-earth exchanged zeolite X plus silica-alumina matrix;

Example XIV—A catalyst prepared as in Example I except that it contains 8% cobalt on rare-earth exchanged zeolite X plus silica-alumina matrix; etc.

It is a particularly unobvious aspect of the novel process of this invention that it is unexpected to find that rare-earth exchanged silico-aluminates containing lesser portions of e.g. cobalt or nickel or both are characterized by increased selectivity calculated as CHB content divided by the content of all other components in the product stream except for unconverted benzene and hydrogen. In comparable examples using catalyst containing (Example XV) 8 wt. % cobalt on rare earth exchanged zeolite Y plus silica-alumina matrix, and (Example XVI) 22 wt. % cobalt on rare earth exchanged zeolite Y plus silica-alumina matrix, the following may be noted:

| | Example XV | Example XVI |
|---|---|---|
| Cobalt content, percent | 8 | 22 |
| CHB selectivity, percent | 55 | 33.7 |
| CHB content, percent | 26 | 17.5 |

It is apparent from inspection of these data, derived from otherwise comparable runs, that the CHB content and selectivity may be simultaneously increased by a factor of about 1.5 by the use of a rare earth exchanged zeolite containing a lesser content of cobalt (8% instead of 22%).

Although this invention has been illustrated by reference to specific embodiments, it will be apparent to those skilled in the art that various changes and modifications may be made which clearly fall within the scope of this invention.

We claim:

1. The method of hydroalkylating a charge mononuclear aromatic hydrocarbon with a hydroalkylating quantity of hydrogen which comprises passing said charge hydrocarbon and said hydroalkylating quantity of hydrogen through a hydroalkylation operation at hydroalkylating conditions in the presence of a hydroalkylation catalyst containing (a) a crystalline aluminosilicate, at least a portion of the metal cation content of which is rare earth metal introduced by base exchange and (b) cobalt or nickel thereby forming a product stream containing hydroalkylate; and recovering said product stream containing hydroalkylate.

2. The method of hydroalkylating a charge mononuclear aromatic hydrocarbon with a hydroalkylating quantity of hydrogen as claimed in Claim 1 wherein said cobalt or nickel is present in the catalyst in amount of 0.1–25% by weight.

3. The method of hydroalkylating a charge mononuclear aromatic hydrocarbon with a hydroalkylating quantity of hydrogen as claimed in Claim 1 wherein said cobalt or nickel is present in the catalyst in amount of 2%–10% by weight.

4. The method of hydroalkylating a charge mononuclear aromatic hydrocarbon with a hydroalkylating quantity of hydrogen as claimed in Claim 1 wherein said cobalt or nickel is impregnated upon the rare earth metal crystalline aluminosilicate.

5. The method of hydroalkylating a charge mononuclear aromatic hydrocarbon with a hydroalkylating quantity of hydrogen as claimed in Claim 1 wherein said cobalt or nickel is impregnated upon a base which is then mixed with the rare earth metal crystalline aluminosilicate.

6. The method of hydroalkylating a charge mononuclear aromatic hydrocarbon with a hydroalkylating quantity of hydrogen as claimed in Claim 1 wherein said cobalt or nickel is exchanged into said aluminosilicate.

7. The method of hydroalkylating a charge mononuclear aromatic hydrocarbon with a hydroalkylating quantity of hydrogen as claimed in Claim 1 wherein said cobalt or nickel is slurried into the mixture from which the crystalline aluminosilicate is produced.

8. The method of hydroalkylating a charge mononuclear aromatic hydrocarbon with a hydroalkylating quantity of hydrogen as claimed in Claim 1 wherein said aluminosilicate is a Y-zeolite or an X-zeolite.

9. The method of hydroalkylating a charge mononuclear aromatic hydrocarbon with a hydroalkylating quantity of hydrogen which comprises
   passing said charge hydrocarbon and said hydroalkylating quantity of hydrogen through a hydroalkylation operation at inlet temperature of 25° C.–230° C. and 100–1500 p.s.i.g. in the presence of hydroalkylation catalyst containing
   (a) a crystalline aluminosilicate, at least a portion of the metal cation content of which is rare earth metal introduced by base exchange and (b) 0.1–25% by weight, of said catalyst, of cobalt or nickel thereby forming a product stream containing hydroalkylate; and
   removing said product stream containing hydroalkylate.

10. The method of hydroalkylating a charge mononuclear aromatic hydrocarbon with a hydroalkylating quantity of hydrogen as claimed in Claim 9 wherein said aluminosilicate is a Y-zeolite.

11. The method of hydroalkylating a charge mononuclear aromatic hydrocarbon with a hydroalkylating quantity of hydrogen as claimed in Claim 9 wherein at least about 75% of the alkali metal content of said aluminosilicate is replaced by rare earth metals.

12. The method of hydroalkylating benzene with a hydroalkylating quantity of hydrogen which comprises
   passing said benzene and said hydroalkylating quantity of hydrogen through a hydroalkylation operation at inlet temperature of 25° C.–230° C. and 100–1500 p.s.i.g. in the presence of a hydroalkylating catalyst containing (a) a crystalline Y-zeolite at least a portion of the metal cation content of which is rare earth metal introduced by base exchange and (b) 0.1–25% by weight, of said catalyst, of cobalt thereby forming a product stream containing hydroalkylate; and
   recovering said product stream containing hydroalkylate.

13. The method of hydroalkylating benzene with a hydroalkylating quantity of hydrogen as claimed in Claim 11 wherein said cobalt is impregnated upon the rare earth metal Y-zeolite.

14. The method of hydroalkylating benzene with a hydroalkylating quantity of hydrogen as claimed in Claim 11 wherein at least about 75% of the alkali metal content of said zeolite is replaced by rare earth metals.

15. The method of hydroalkylating benzene with a hydroalkylating quantity of hydrogen as claimed in Claim 11 wherein at least about 75%–90% of the alkali metal content of said zeolite is replaced by rare earth metals.

16. The method of hydroalkylating charge benzene with a hydroalkylating quantity of hydrogen which comprises
   passing said charge benzene and said hydroalkylating quantity of hydrogen through a hydroalkylation operation at hydroalkylating conditions in the presence of a hydroalkylation catalyst containing (a) a crystalline aluminosilicate, at least a portion of the metal cation content of which is rare earth metal introduced by base exchange and (b) cobalt or nickel thereby forming a product stream containing cyclohexylbenzene; and
   recovering said product stream containing cyclohexylbenzene.

17. The method of hydroalkylating charge toluene with a hydroalkylating quantity of hydrogen which comprises
   passing said charge toluene and said hydroalkylating quantity of hydrogen through a hydroalkylation operation at hydroalkylating conditions in the presence of a hydroalkylation catalyst containing (a) a crystalline aluminosilicate, at least a portion of the metal cation content of which is rare earth metal introduced by base exchange and (b) cobalt or nickel thereby forming a product stream containing methylcyclohexyltoluene; and
   recovering said product stream containing methylcyclohexyltoluene.

References Cited
UNITED STATES PATENTS

| | | | |
|---|---|---|---|
| 3,153,678 | 10/1964 | Logemann | 260—667 |
| 3,274,276 | 9/1966 | Louvar | 260—668 R |
| 3,412,165 | 11/1968 | Slaugh et al. | 260—668 R |
| 3,760,017 | 9/1973 | Arkell et al. | 260—668 R |
| 3,760,018 | 9/1973 | Suggitt et al. | 260—668 R |
| 3,760,019 | 9/1973 | Crone et al. | 260—668 R |

CURTIS R. DAVIS, Primary Examiner

U.S. Cl. X.R.

260—667